United States Patent
Li et al.

(10) Patent No.: US 7,236,748 B2
(45) Date of Patent: Jun. 26, 2007

(54) CLOSED LOOP FEEDBACK IN MIMO SYSTEMS

(75) Inventors: Qinghua Li, Sunnyvale, CA (US); Xintian E. Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 10/955,826

(22) Filed: Sep. 30, 2004

(65) Prior Publication Data

US 2006/0068738 A1 Mar. 30, 2006

(51) Int. Cl.
*H04B 1/38* (2006.01)
*H04M 1/00* (2006.01)

(52) U.S. Cl. .................. 455/69; 455/562.1

(58) Field of Classification Search .......... 455/69, 455/562.1, 561, 101, 103, 272–273, 276.1, 455/277.1, 277.2; 375/299, 347; 370/208
See application file for complete search history.

(56) References Cited

U.S. PATENT DOCUMENTS

| | | | | |
|---|---|---|---|---|
| 5,999,826 | A * | 12/1999 | Whinnett | 455/561 |
| 6,597,678 | B1 * | 7/2003 | Kuwahara et al. | 370/342 |
| 6,847,805 | B2 * | 1/2005 | Liu | 455/69 |
| 6,927,728 | B2 | 8/2005 | Vook et al. | |
| 2003/0125040 | A1 * | 7/2003 | Walton et al. | 455/454 |
| 2003/0210750 | A1 * | 11/2003 | Onggosanusi et al. | 375/295 |
| 2004/0235433 | A1 * | 11/2004 | Hugl et al. | 455/101 |
| 2005/0101259 | A1 | 5/2005 | Tong et al. | |
| 2005/0286663 | A1 | 12/2005 | Poon | |
| 2006/0056335 | A1 | 3/2006 | Lin et al. | |
| 2006/0056531 | A1 | 3/2006 | Li et al. | |
| 2006/0068718 | A1 * | 3/2006 | Li et al. | 455/69 |
| 2006/0092054 | A1 | 5/2006 | Li et al. | |

OTHER PUBLICATIONS

International Search Report and Written Opinion of the International Seraching Authority; Dated Jan. 31, 2006; PCT/US2005/031585, 1-13.
International Search Report and Written Opinion of the International Searching Authority; Dated Sep. 16, 2005; PCT/US2005/017774; 15 Pages.
"PCT Search Report", PCT/US2005/031979, (Jan. 23, 2006), 12 pages.
Jihoon, C., "Interpolation based transmit beamforming for MIMO-OFDM with Limited Feedback", *IEEE International Conference on Paris, France, Piscataway, NJ, USA.*, P20442PCT—PCT Search Report Written Opinion from PCT application serial No. PCT/US2005/031585,(Jun. 20, 2004),249-253.

* cited by examiner

*Primary Examiner*—Nguyen T. Vo
(74) *Attorney, Agent, or Firm*—LeMoine Patent Services, PLLC; Dana B. LeMoine

(57) ABSTRACT

Feedback bandwidth may be reduced in a closed loop MIMO system by representing a beamforming matrix using orthogonal generator matrices.

23 Claims, 4 Drawing Sheets

CLOSED LOOP FEEDBACK IN MIMO SYSTEMS

FIELD

The present invention relates generally to wireless networks, and more specifically to wireless networks that utilize multiple spatial channels.

BACKGROUND

Closed loop multiple-input-multiple-output (MIMO) systems typically transmit channel state information from a receiver to a transmitter. The transmitter may then utilize the information to do beam forming. Transmitting the channel state information consumes bandwidth that might otherwise be available for data traffic.

DESCRIPTION OF EMBODIMENTS

Figure 1:
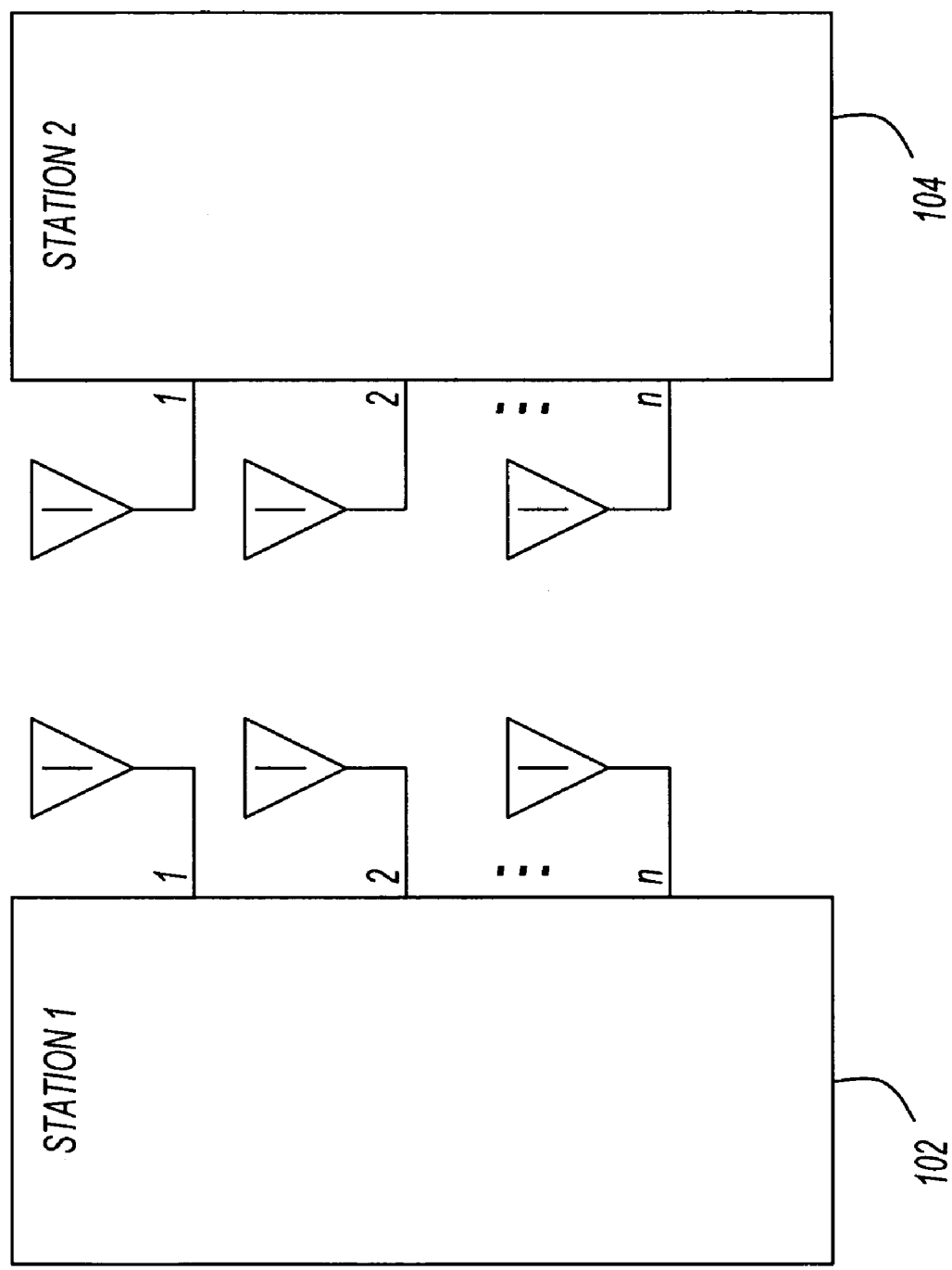
FIG. 1 shows a diagram of two wireless stations.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of two wireless stations: station 102, and station 104. In some embodiments, stations 102 and 104 are part of a wireless local area network (WLAN). For example, one or more of stations 102 and 104 may be an access point in a WLAN. Also for example, one or more of stations 102 and 104 may be a mobile station such as a laptop computer, personal digital assistant (PDA), or the like. Further, in some embodiments, stations 102 and 104 are part of a wireless wide area network (WWAN), and still further embodiments, stations 102 and 104 are part of a wireless personal area network (WPAN).

In some embodiments, stations 102 and 104 may operate partially in compliance with, or completely in compliance with, a wireless network standard. For example, stations 102 and 104 may operate partially in compliance with a standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition. Also for example, stations 102 and 104 may operate partially in compliance with any other standard, such as any future IEEE personal area network standard or wide area network standard.

Stations 102 and 104 each include multiple antennas. Each of stations 102 and 104 includes "n" antennas, where n may be any number. In some embodiments, stations 102 and 104 have an unequal number of antennas. The remainder of this description discusses the case where stations 102 and 104 have an equal number of antennas, but the various embodiments of the invention are not so limited. The "channel" through which stations 102 and 104 communicate may include many possible signal paths. For example, when stations 102 and 104 are in an environment with many "reflectors" (e.g. walls, doors, or other obstructions), many signals may arrive from different paths. This condition is known as "multipath." In some embodiments, stations 102 and 104 utilize multiple antennas to take advantage of the multipath and to increase the communications bandwidth. For example, in some embodiments, stations 102 and 104 may communicate using Multiple-Input-Multiple-Output (MIMO) techniques. In general, MIMO systems offer higher capacities by utilizing multiple spatial channels made possible by multipath.

In some embodiments, stations 102 and 104 may communicate using orthogonal frequency division multiplexing (OFDM) in each spatial channel. Multipath may introduce frequency selective fading which may cause impairments like inter-symbol interference (ISI). OFDM is effective at combating frequency selective fading in part because OFDM breaks each spatial channel into small subchannels such that each subchannel exhibits a more flat channel characteristic. Each channel may be scaled appropriately to correct any attenuation caused by the subchannel. Further, the data carrying capacity of each subchannel may be controlled dynamically depending on the fading characteristics of the subchannel.

MIMO systems may operate either "open loop" or "closed loop." In open loop MIMO systems, a station estimates the state of the channel without receiving channel state information directly from another station. In general, open loop systems employ exponential decoding complexity to estimate the channel. In closed loop systems, communications bandwidth is utilized to transmit current channel state information between stations, thereby reducing the necessary decoding complexity. The communications bandwidth used for this purpose is referred to herein as "feedback bandwidth." When feedback bandwidth is reduced in closed loop MIMO systems, more bandwidth is available for data communications.

The current channel state information may be represented by an n by n unitary beamforming matrix V determined using a singular value decomposition (SVD) algorithm, and the transmitter may process an outgoing signal using the beamforming matrix V to transmit into multiple spatial channels. In a straightforward implementation, the receiver sends each element of the unitary matrix V back to the transmitter. This scheme involves sending information related to the $2n^2$ real numbers for any n by n complex unitary matrix, where n is the number of spatial channels in the MIMO system.

In some embodiments of the present invention, the beamforming matrix V is represented by $n^2-1$ real numbers instead of $2n^2$ real numbers. By sending $n^2-1$ real numbers instead of $2n^2$ real numbers to represent the beamforming matrix, the feedback bandwidth may be reduced. Various embodiments of the present invention exploit the structure of unitary matrixes and represent the unitary matrices by a combination of $n^2-1$ orthogonal generator matrices, where the feedback numbers are the projections on the generator bases. For example, multiple hermitian generator matrices known to both the transmitter and receiver may be utilized to represent the beamforming matrix. Further, the numbers are also angles from $-\pi$ to $\pi$ of an $(n^2-1)$-dimension polar coordinate, which facilitate a fine control of quantization error.

A mathematical background of the SVD operation is provided below, and then examples are provided to describe various embodiments of the present invention that utilize hermitian generator matrices to represent beamforming matrices of any size. Further examples are also provided illustrating compact feedback formats for 2×2 MIMO systems.

A transmit beamforming matrix may be found using SVD as follows:

$$H = UDV' \quad (1)$$

$$x = Vd \quad (2)$$

where d is the n-vector of code bits for n data streams; x is the transmitted signal vector on the antennas; H is the channel matrix; H's singular value decomposition is H=UDV'; U and V are unitary; D is a diagonal matrix with H's eigenvalues; V is n by n, and n is the number of spatial channels. To obtain V at the transmitter, the transmitter may send training symbols to the receiver; the receiver may evaluate H, compute the matrix V'; and the receiver may feedback parameters representing V to the transmitter. As described more fully below, the number of feedback parameters used to represent V may be reduced by representing the beamforming matrix using a weighted sum of orthogonal generator matrices.

A generic n by n complex matrix satisfying the following condition $VV'=I_n$ is a unitary matrix. All n by n unitary matrices may be considered to form a group U(n). Its generic representation may be written as:

$$V = \exp\left(i \sum_{k=1}^{n^2} a_k G_k\right) \quad (3)$$

where $G_k$ is the k-th hermitian generator matrix; $a_k$ is the angle of the k-th rotation and it is between $-\pi$ and $\pi$; and i is the square root of $-1$. Example generator matrices for n=2, 3, and 4 are provided at the end of this description. It should be noticed that the set of generator matrices for n=m is a subset of the set for n=m+1. Therefore, a 4 by 4 system may store only the matrices for n=4, and matrices for n=2 and n=3 may be determined from the stored matrices. Although example generator matrices are only provided up to n=4, this is not a limitation of the present invention. Any number of generator matrices, corresponding to various values of n, may be utilized without departing from the scope of the present invention.

It is noted that the last generator $G_{n^2}$ in U(n) is a scaled identity matrix and it commutes with all other generator matrices. Accordingly, the unitary matrix can be written as $$V = \exp(i c_0 a_{n^2}) \exp\left(i \sum_{k=1}^{n^2-1} a_k G_k\right) = e^{i\psi} \overline{V} \quad (4)$$

where $\det(\overline{V})=1$ and $\psi$ is a global phase. In some embodiments, $\psi$ is not fed back to the transmitter. The term $e^{i\psi}$ can be factored out from V in equation (4) and absorbed by the data vector d in equation (2). The term $e^{i\psi}$ rotates the QAM constellation of d's elements and the rotation may be compensated by the training. Accordingly, in some embodiments, $\psi$ may be dropped to reduce feedback bandwidth and only $n^2-1$ angles (i.e. $a_1 \ldots a_{n^2-1}$) are fed back. Further, in some embodiments, adaptive bit loading is utilized to reduce the feedback bandwidth further. For example, various parameters may be quantized with different numbers of bits prior to feeding back the parameters.

In embodiments in which $n^2-1$ angles (i.e. $a_1 \ldots a_{n^2-1}$) are fed back, the feedback angles are computed by the receiver that received channel training symbols. After the angles are computed, the receiver feeds back the angles to the transmitter of training symbols.

Although various embodiments of the present invention feed back $n^2-1$ angles, it can be shown that n−1 of those angles are not needed at the transmitter since the training can compensate the effect. When the n−1 angles referred to above are not included in the feedback, the number of angles fed back is reduced to $n^2-n$ parameters.

Feeding back $n^2-1$ parameters instead of $n^2-n$ parameters provides more information at the transmitter that may be useful in many ways. For example, in OFDM systems with m subcarriers, the transmitter uses a beamforming matrix for each of the m OFDM subcarriers. In some embodiments of the present invention, $n^2-1$ parameters are fed back for less than all of the m subcarriers, and the transmitter may then interpolate to arrive at the beamforming matrices for the remaining subcarriers. Extra information is provided by the n−1 angles, and the interpolation may make use of this extra information.

The feedback angles may be computed as follows.

1) Singular value decomposition of the channel matrix H $$H = U\ D\ V' \quad (5)$$

where ' is the conjugate transpose operation.

2) Eigenvalue decomposition of matrix V $$V = M\ D\ M^{-1} \quad (6)$$

where D is a diagonal matrix with norm 1 diagonal elements.

3) Natural logarithm of V $$\log(V) = M \log(D) M^{-1} \quad (7)$$

where log(D) essentially computes the phase of diagonal elements of D.

4) Project log(V) to the $n^2-1$ generator matrixes $$a_k = -\frac{i}{2} \text{trace}\,[\log(V) G'_k], \quad \text{for } k = 1, \ldots, n^2-1 \quad (8)$$

The receiver may transmit $(a_1 \ldots a_{n^2-1})$ to the transmitter, which may then reconstruct the beamforming matrix $\overline{V}$ as follows.

$$A = i\sum_{k=1}^{n^2-1} a_k G_k \qquad (9)$$

$$A = P\Lambda P^{-1} \qquad (10)$$

$$\hat{V} = P\,diag[\exp(\lambda_1) \cdots \exp(\lambda_n)]P^{-1} \qquad (11)$$

and the transmitter may perform transmit beamforming as:

$$x = \hat{V}d \qquad (12)$$

Various embodiments of the present invention also reduce the range of the quantized feedback numbers from $(-\infty, \infty)$ to $(-\pi, \pi]$. For example, real numbers included in a beamforming matrix generally take on values of $(-\infty, \infty)$, while the angles $a_k$ may take on values of $(-\pi, \pi]$. In some embodiments, the range of $(-\pi, \pi]$ can be represented with fewer bits, and in other embodiments, greater precision is provided because of the smaller range.

Compact Feedback Formats for 2×2 MIMO Systems

As described above, various embodiments of the present invention provide compact feedback formats for n by n MIMO systems, where n may be of any size. In some embodiments, compact feedback formats are further developed for the case of MIMO systems with two spatial channels. These compact formats may be utilized in 2 by 2 MIMO systems, or in higher order systems that use less than all available spatial channels.

Two compact feedback schemes are described below. The first scheme feeds back one sign bit and three real numbers between −1 and 1. The computation of the numbers utilizes basic trigonometric functions which may be implemented by the FFT table for 802.11 OFDM modulation. The reconstruction of the unitary matrix utilizes a square root operation. The second scheme feeds back three angles with ranges $[0,\pi)$, $[0,\pi)$, and $(-\pi,\pi]$. Two of the three ranges are smaller than the more general case described above and leads to a smaller quantization error under the same number of quantization bits.

As described above, any unitary matrix V can be written as $$V = \exp(ic_0 a_{n^2})\exp\left(i\sum_{k=1}^{n^2-1} a_k G_k\right) = e^{i\psi}\overline{V} \qquad (13)$$

where $G_k$ is the k-th hermitian generator matrix; $a_k$ is the angle of the k-th rotation and it is between $-\pi$ and $\pi$; i is the square root of −1; $\overline{V}$ is unitary and $\det(\overline{V})=1$; $\psi$ is a global phase. $\overline{V}$ can be computed as $$\overline{V} = \frac{V}{\sqrt{\det(V)}} \qquad (14)$$

We can expand $\overline{V}$ in series as $$\overline{V} = \exp\left(i\sum_{k=1}^{n^2-1} a_k G_k\right) = \sum_{m=0}^{\infty} \frac{1}{m!}\left(i\sum_{k=1}^{n^2-1} \varphi n_k G_k\right)^m, \qquad (15)$$

$$\varphi = \left(\sum_{k=1}^{n^2-1} a_k^2\right)^{1/2}, \quad a_k = \varphi n_k$$

For 2×2 matrix $\overline{V}$, (15) can be simplified by using $$\left(\sum_{k=1}^{3} n_k G_k\right)^2 = I,$$

to yield:

$$\overline{V} = \cos(\Phi)G_4 + i\sin(\Phi)(n_1 G_1 + n_2 G_2 + n_3 G_3) \qquad (16)$$

In this representation, we can limit $\Phi$ in $[0, \pi)$ and $n_k$ are real between $[-1,1]$. Using the orthogonal and unitary property, we have:

$$\cos(\varphi) = \frac{1}{2}\,\text{trace}\,(\overline{V}G_4') \qquad (17)$$

$$n_k = \frac{-i}{2\sin(\varphi)}\,\text{trace}\,(\overline{V}G_k')\;\text{for}\;k=1,2,3 \qquad (18)$$

Since $(n_1, n_2, n_3)$ is a real, unit 3-vector, it can be described by two angles $\theta, \Phi$ as follows.

$$n_1 = \sin(\theta)\cos(\phi) \qquad (19)$$

$$n_2 = \sin(\theta)\sin(\phi) \qquad (20)$$

$$n_3 = \cos(\theta) \qquad (21)$$

where $\theta$ is between $[0, \pi)$ and $\phi$ is between $[-\pi, \pi)$.

From above, we derive two schemes to feed back information representing the beamforming matrix $\overline{V}$. Scheme 1 sends back $\cos(\Phi)$, $n_2$, $n_3$, and the sign of $n_1$. The feedback numbers are between $[-1,1]$ except for the sign bit. This scheme limits the quantization range and doesn't require sine and cosine functions during reconstruction. Scheme 2 sends back $\Phi$, $\theta$ and $\phi$, which are between $[0, \pi)$, $[0, \pi)$, and $[0, 2\pi)$, respectively. This scheme utilizes sine and cosine functions during reconstruction. In some embodiments, the angles may be quantized at low resolution to reduce overhead, and existing 64 or 128 FFT tables in 802.11 OFDM baseband systems may be used to approximate the sine and cosine functions. The schemes are illustrated next.

Scheme 1 is illustrated as follows.

1) Singular value decomposition of the channel matrix H $$H = UDV' \qquad (22)$$

where ' is the conjugate transpose operation.

2) Remove the global phase of the unitary matrix V $$\overline{V} = \frac{V}{\sqrt{\det(V)}} \qquad (23)$$

3) Compute feedback numbers $$\cos(\varphi) = \frac{1}{2}\text{trace}(\overline{V}G_4') \quad (24)$$

$$n_k = \frac{-i}{2\sqrt{1-\cos^2(\varphi)}}\text{trace}(\overline{V}G_k') \quad (25)$$

4) Receiver quantizes $\cos(\Phi)$, $n_2$, $n_3$, and sends back with $\text{sign}(n_1)$ The transmitter may then reconstruct $\overline{V}$ using $\cos(\Phi)$, $n_2$, $n_3$ and $\text{sign}(n_1)$ $$n_1 = \text{sign}(n_1)\sqrt{1-n_2^2-n_3^2} \quad (26)$$

$$\overline{V} = \cos(\Phi)G_4 - i\sqrt{1-\cos^2(\Phi)}(n_1G_1+n_2G_2+n_3G_3) \quad (27)$$

Scheme 2 is illustrated as follows.
1) Singular value decomposition of the channel matrix H $$H = UDV' \quad (28)$$

where ' is the conjugate transpose operation.
2) Remove the global phase of the unitary matrix V $$\overline{V} = \frac{V}{\sqrt{det(V)}} \quad (29)$$

3) Compute feedback numbers $$\cos(\varphi) = \frac{1}{2}\text{trace}(\overline{V}G_4') \quad (30)$$

$$n_k = \frac{-i}{2\sqrt{1-\cos^2(\varphi)}}\text{trace}(\overline{V}G_k') \quad (31)$$

4) Calculate angle $\theta$ and $\phi$ $$\theta = \arccos(n_3), \theta \in [0, \pi) \quad (32)$$

$$\phi = \begin{cases} \arctan\left(\frac{n_2}{n_1}\right), & n_1 \geq 0 \\ \arctan\left(\frac{n_2}{n_1}\right) + \pi, & n_1 < 0 \end{cases}$$

5) Receiver quantizes and feeds back $\Phi$, $\theta$ and $\phi$
The transmitter may then reconstruct $\overline{V}$ using $\Phi$, $\theta$ and $\phi$ $$n_1 = \sin(\theta)\cos(\phi) \quad (33)$$

$$n_2 = \sin(\theta)\sin(\phi) n_3 = \cos(\theta) \quad (34)$$

$$\overline{V} = \cos(\Phi)G_4 + i\sin(\Phi)(n_1G_1+n_2G_2+n_3G_3) \quad (35)$$

Figure 2:
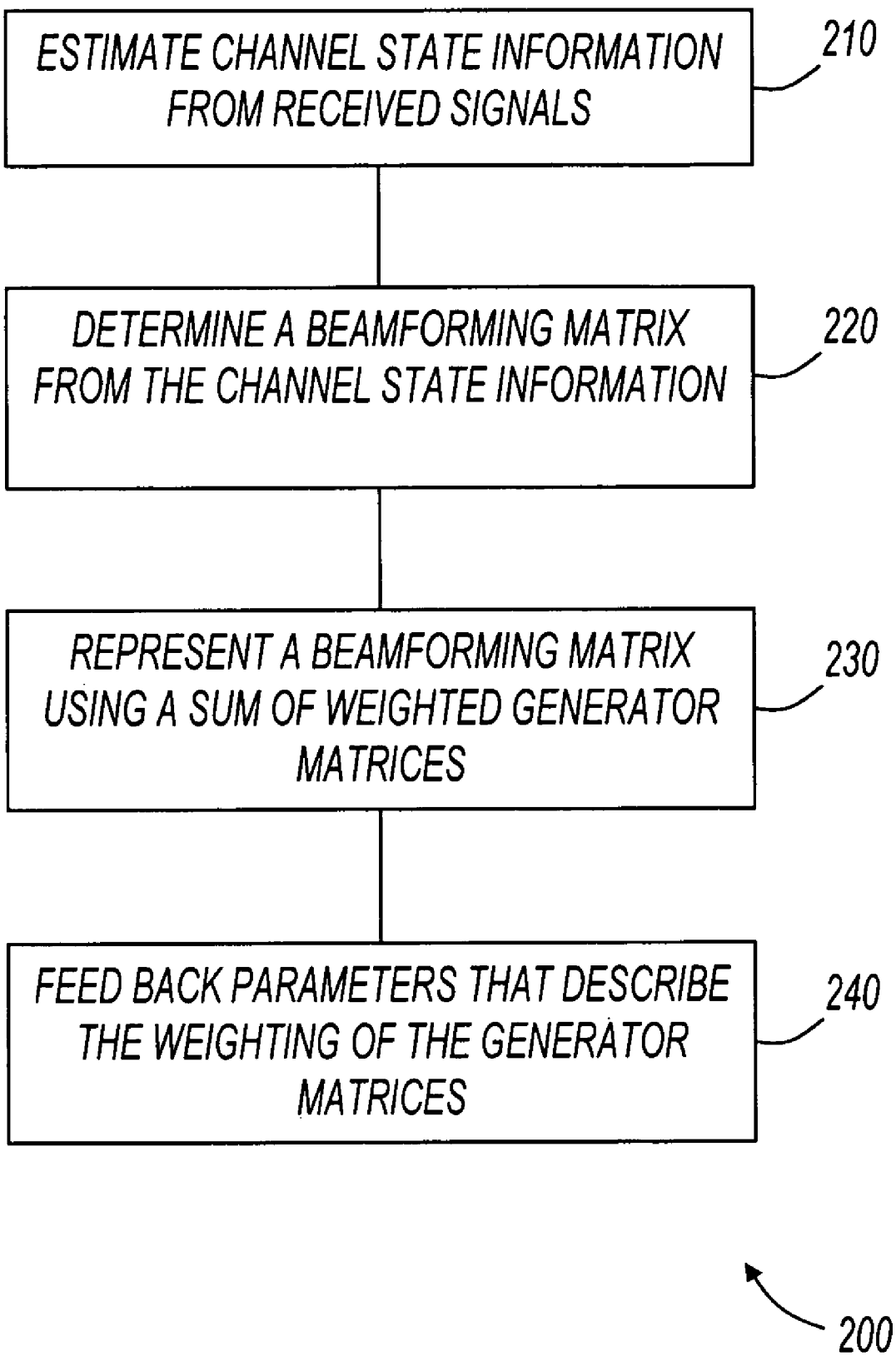
FIGS. 2 and 3 show flowcharts in accordance with various embodiments of the present invention.

FIG. 2 shows a flowchart in accordance with various embodiments of the present invention. In some embodiments, method 200 may be used in, or for, a wireless system that utilizes MIMO technology. In some embodiments, method 200, or portions thereof, is performed by a wireless communications device, embodiments of which are shown in the various figures. In other embodiments, method 200 is performed by a processor or electronic system. Method 200 is not limited by the particular type of apparatus or software element performing the method. The various actions in method 200 may be performed in the order presented, or may be performed in a different order. Further, in some embodiments, some actions listed in FIG. 2 are omitted from method 200.

Method 200 is shown beginning at block 210 in which channel state information is estimated from received signals. The channel state information may include the channel state matrix H described above. At 220, a beamforming matrix is determined from the channel state information. In some embodiments, this corresponds to performing singular value decomposition (SVD) as described above with reference to equation (1). The beamforming matrix V is also described above.

At 230, a beamforming matrix is represented using a sum of weighted generator matrices. For example, as shown above in equation (3), in some embodiments, the beamforming matrix may be represented using a sum of weighted hermitian generator matrices. In other embodiments, the beamforming matrix may be represented using equation (16). The parameters may be generated by projecting the beamforming matrix onto the generator matrices as described above with reference to the various embodiments of the present invention.

At 240, parameters that describe the weighting of the generator matrices are fed back to a transmitter. For example, in embodiments that utilize equation (3), the parameters may include coefficients such as $(a_1 \ldots a_{n^2-1})$, and in embodiments that utilize equation (16), the parameters may include coefficients such as $\cos(\Phi)$, $n_2$, $n_3$, and the sign of $n_1$. Further, in some embodiments that utilize equations (16)-(21), the parameters may include $\Phi$, $\theta$ and $\phi$.

In some embodiments, $n^2-1$ parameters are chosen to represent the weighting of generators matrices. For example, in a 2 by 2 MIMO system, three parameters may be used to represent the sum of the weighted generator matrices. In other embodiments, a sign bit is used in conjunction with $n^2-1$ parameters to reduce the quantization range of one or more parameters.

Prior to feeding back to the transmitter, the parameters may be quantized in the ranges appropriate for the range of the parameters selected. For example, in embodiments that feed back $(a_1 \ldots a_{n^2-1})$, the angles $a_k$ can be quantized in the range $[-\pi, \pi)$. Further, in embodiments that feed back $\cos(\Phi)$, $n_2$, $n_3$, and the sign of $n_1$, the parameters may be quantized in the range of $[-1, 1)$. In still further embodiments, the parameters $\Phi$, $\theta$ and $\phi$ may be quantized between $[0, \pi)$, $[0, \pi)$, and $[0, 2\pi)$, respectively. The quantized parameters may be transmitted using any type of protocol or any type of communications link, including a wireless link such as a wireless link between stations like those described with reference to FIG. 1.

In some embodiments, parameters are fed back for less than all OFDM subcarriers. For example, parameters may be fed back for every other OFDM subcarrier, or parameters may be fed back for fewer than every other OFDM subcarrier. In these embodiments, a system that receives the parameters may interpolate to arrive at beamforming matrices for each OFDM subcarrier.

Figure 3:
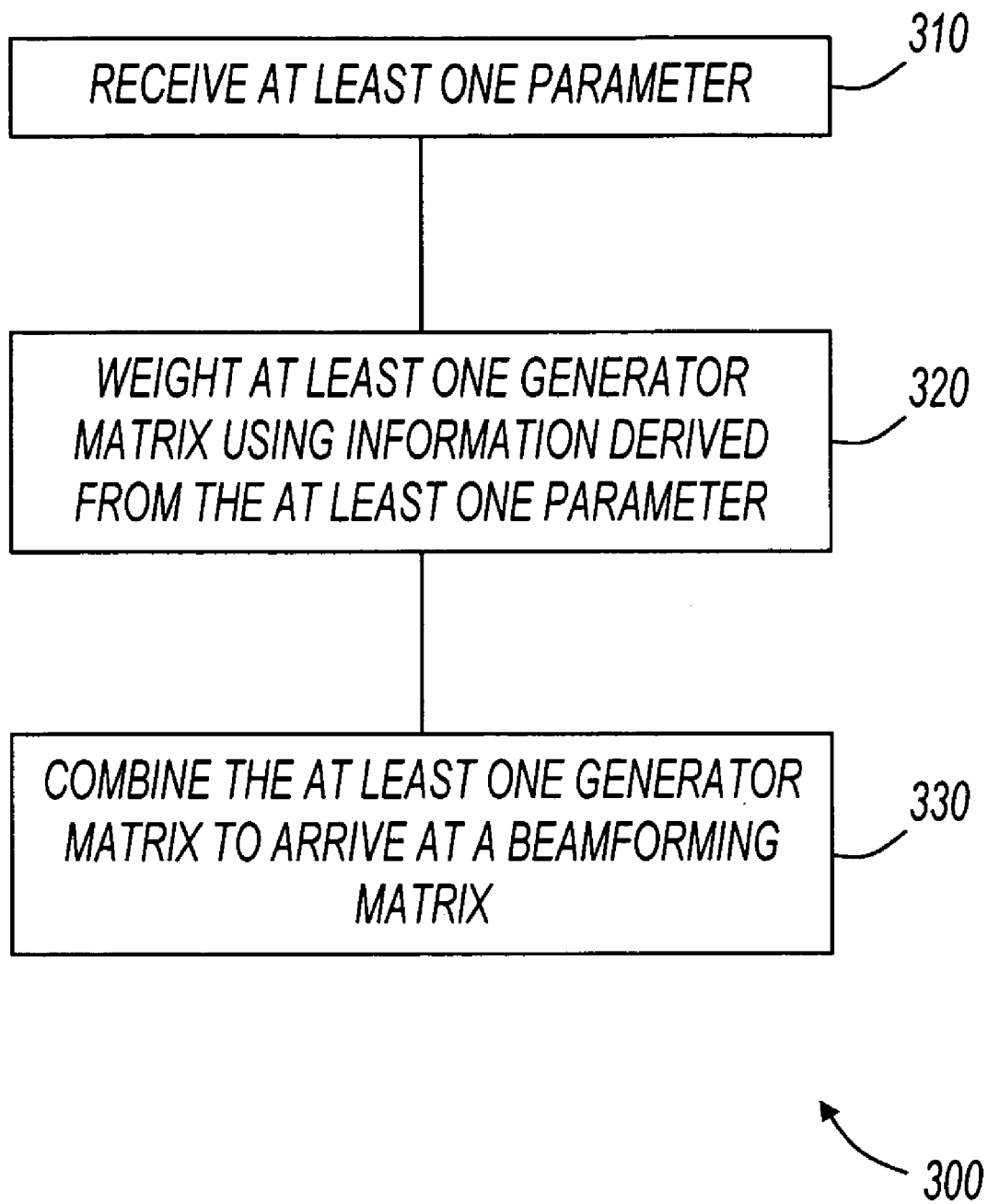

FIG. 3 shows a flowchart in accordance with various embodiments of the present invention. In some embodiments, method 300 may be used in, or for, a wireless system that utilizes MIMO technology. In some embodiments, method 300, or portions thereof, is performed by a wireless communications device, embodiments of which are shown in the various figures. In other embodiments, method 300 is performed by a processor or electronic system. Method 300 is not limited by the particular type of apparatus or software element performing the method. The various actions in method 300 may be performed in the order presented, or may be performed in a different order. Further, in some embodiments, some actions listed in FIG. 3 are omitted from method 300.

Method 300 is shown beginning at block 310 in which at least one parameter is received. In some embodiments, this may correspond to a transmitter receiving one or more parameters that represent a sum of rotated generator matrices. In some embodiments, the parameters may include coefficients with which the generator matrices are to be weighted, and in other embodiments, the parameters may include other angle parameters such as $\Phi$, $\theta$ and $\phi$, or coefficients such as $\cos(\Phi)$, $n_2$, $n_3$, all of which are described above with reference to the previous figures.

At 320, at least one generator matrix is weighted using information derived from the at least one parameter, and at 330, the generator matrices are combined to arrive at a beamforming matrix. For example, hermitian generator matrices may be weighted and combined as shown in equations (9)-(11), (26)-(27), or (33)-(35). Further, the beamforming matrix may be used in beamforming as described above with reference to the various embodiments of the present invention.

In some embodiments, the acts of block 310 may result in parameters for less than all OFDM subcarriers being received. For example, parameters may be received for every other OFDM subcarrier, or parameters may be received for fewer than every other subcarrier. In these embodiments, method 300 may interpolate to arrive at OFDM subcarrier beamforming matrices for which no parameters were received.

Figure 4:
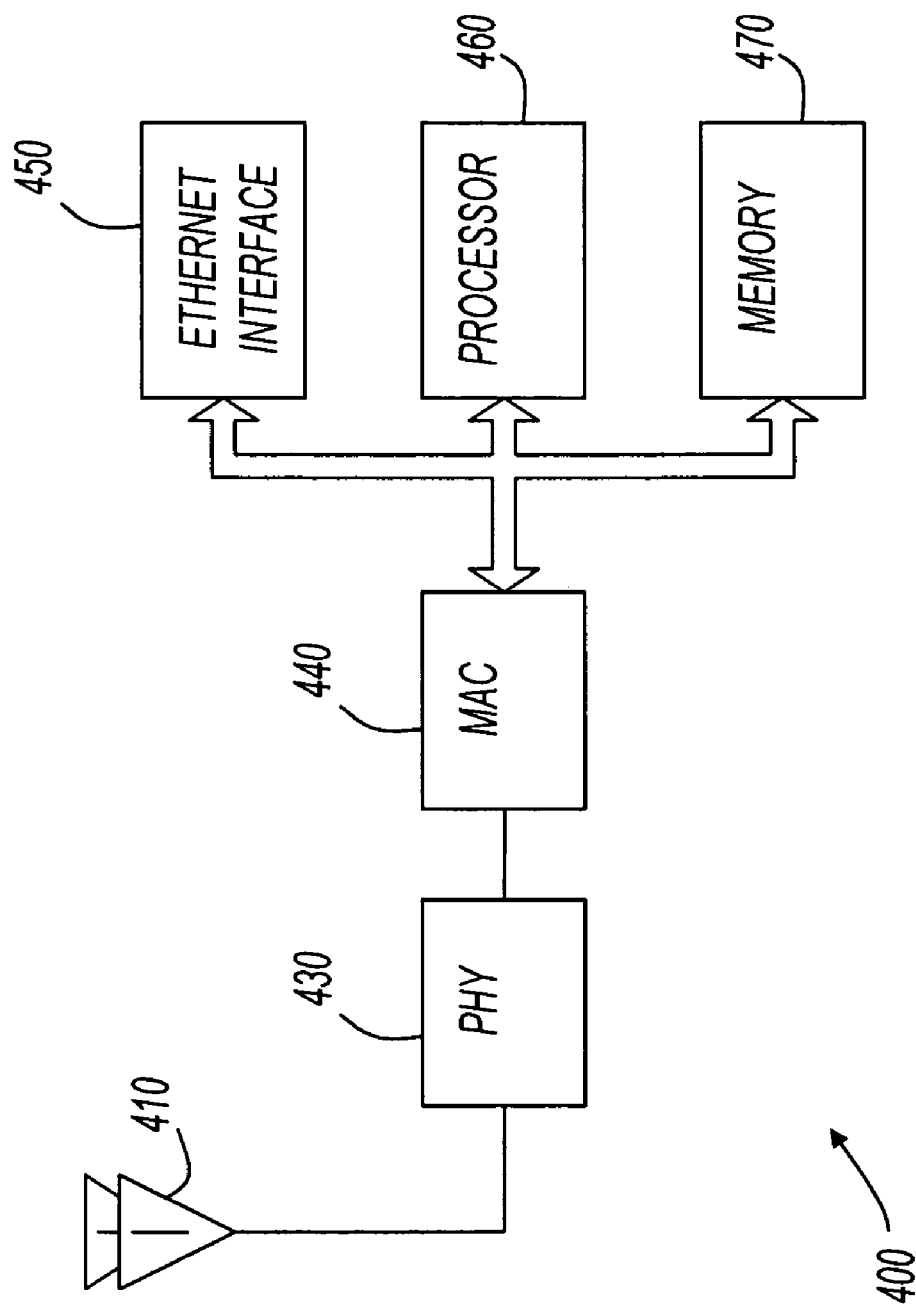
FIG. 4 shows an electronic system in accordance with various embodiments of the present invention.

FIG. 4 shows a system diagram in accordance with various embodiments of the present invention. Electronic system 400 includes antennas 410, physical layer (PHY) 430, media access control (MAC) layer 440, Ethernet interface 450, processor 460, and memory 470. In some embodiments, electronic system 400 may be a station capable of representing beamforming matrices using generator matrices as described above with reference to the previous figures. In other embodiments, electronic system 400 may be a station that receives quantized parameters, and performs beamforming in a MIMO system. For example, electronic system 400 may be utilized in a wireless network as station 102 or station 104 (FIG. 1). Also for example, electronic system 400 may be a station capable of performing the calculations shown in any of the equations (1)-(35), above.

In some embodiments, electronic system 400 may represent a system that includes an access point or mobile station as well as other circuits. For example, in some embodiments, electronic system 400 may be a computer, such as a personal computer, a workstation, or the like, that includes an access point or mobile station as a peripheral or as an integrated unit. Further, electronic system 400 may include a series of access points that are coupled together in a network.

In operation, system 400 sends and receives signals using antennas 410, and the signals are processed by the various elements shown in FIG. 4. Antennas 410 may be an antenna array or any type of antenna structure that supports MIMO processing. System 400 may operate in partial compliance with, or in complete compliance with, a wireless network standard such as an 802.11 standard.

Physical layer (PHY) 430 is coupled to antennas 410 to interact with a wireless network. PHY 430 may include circuitry to support the transmission and reception of radio frequency (RF) signals. For example, in some embodiments, PHY 430 includes an RF receiver to receive signals and perform "front end" processing such as low noise amplification (LNA), filtering, frequency conversion or the like. Further, in some embodiments, PHY 430 includes transform mechanisms and beamforming circuitry to support MIMO signal processing. Also for example, in some embodiments, PHY 430 includes circuits to support frequency up-conversion, and an RF transmitter.

Media access control (MAC) layer 440 may be any suitable media access control layer implementation. For example, MAC 440 may be implemented in software, or hardware or any combination thereof. In some embodiments, a portion of MAC 440 may be implemented in hardware, and a portion may be implemented in software that is executed by processor 460. Further, MAC 440 may include a processor separate from processor 460.

In operation, processor 460 reads instructions and data from memory 470 and performs actions in response thereto. For example, processor 460 may access instructions from memory 470 and perform method embodiments of the present invention, such as method 200 (FIG. 2) or method 300 (FIG. 3) or methods described with reference to other figures. Processor 460 represents any type of processor, including but not limited to, a microprocessor, a digital signal processor, a microcontroller, or the like.

Memory 470 represents an article that includes a machine readable medium. For example, memory 470 represents a random access memory (RAM), dynamic random access memory (DRAM), static random access memory (SRAM), read only memory (ROM), flash memory, or any other type of article that includes a medium readable by processor 460. Memory 470 may store instructions for performing the execution of the various method embodiments of the present invention. Memory 470 may also store beamforming matrices or beamforming vectors.

Although the various elements of system 400 are shown separate in FIG. 4, embodiments exist that combine the circuitry of processor 460, memory 470, Ethernet interface 450, and MAC 440 in a single integrated circuit. For example, memory 470 may be an internal memory within processor 460 or may be a microprogram control store within processor 460. In some embodiments, the various elements of system 400 may be separately packaged and mounted on a common circuit board. In other embodiments, the various elements are separate integrated circuit dice packaged together, such as in a multi-chip module, and in still further embodiments, various elements are on the same integrated circuit die.

Ethernet interface 450 may provide communications between electronic system 400 and other systems. For example, in some embodiments, electronic system 400 may be an access point that utilizes Ethernet interface 450 to communicate with a wired network or to communicate with other access points. Some embodiments of the present invention do not include Ethernet interface 450. For example, in some embodiments, electronic system 400 may be a network interface card (NIC) that communicates with a computer or network using a bus or other type of port.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

Generator Matrices

For U(2) group, the generator matrices are:

$$G_1 = \begin{pmatrix} 0 & 1 \\ 1 & 0 \end{pmatrix}, G_2 = \begin{pmatrix} 0 & -i \\ i & 0 \end{pmatrix}, G_3 = \begin{pmatrix} 1 & 0 \\ 0 & -1 \end{pmatrix}, G_4 = \begin{pmatrix} 1 & 0 \\ 0 & 1 \end{pmatrix}$$

For U(3) group, the generator matrices are:

$$G_1 = \begin{pmatrix} 0 & 1 & 0 \\ 1 & 0 & 0 \\ 0 & 0 & 0 \end{pmatrix}, G_2 = \begin{pmatrix} 0 & -i & 0 \\ i & 0 & 0 \\ 0 & 0 & 0 \end{pmatrix}, G_3 = \begin{pmatrix} 1 & 0 & 0 \\ 0 & -1 & 0 \\ 0 & 0 & 0 \end{pmatrix},$$

$$G_4 = \begin{pmatrix} 0 & 0 & 1 \\ 0 & 0 & 0 \\ 1 & 0 & 0 \end{pmatrix}, G_5 = \begin{pmatrix} 0 & 0 & -i \\ 0 & 0 & 0 \\ i & 0 & 0 \end{pmatrix}, G_6 = \begin{pmatrix} 0 & 0 & 0 \\ 0 & 0 & 1 \\ 0 & 1 & 0 \end{pmatrix},$$

$$G_7 = \begin{pmatrix} 0 & 0 & 0 \\ 0 & 0 & -i \\ 0 & i & 0 \end{pmatrix}, G_8 = \frac{1}{\sqrt{3}}\begin{pmatrix} 1 & 0 & 0 \\ 0 & 1 & 0 \\ 0 & 0 & -2 \end{pmatrix}, G_9 = \sqrt{\frac{2}{3}}\begin{pmatrix} 1 & 0 & 0 \\ 0 & 1 & 0 \\ 0 & 0 & 1 \end{pmatrix}$$

For U(4) group, the generator matrices are:

$$G_1 = \begin{pmatrix} 0 & 1 & 0 & 0 \\ 1 & 0 & 0 & 0 \\ 0 & 0 & 0 & 0 \\ 0 & 0 & 0 & 0 \end{pmatrix}, G_2 = \begin{pmatrix} 0 & -i & 0 & 0 \\ i & 0 & 0 & 0 \\ 0 & 0 & 0 & 0 \\ 0 & 0 & 0 & 0 \end{pmatrix},$$

$$G_3 = \begin{pmatrix} 1 & 0 & 0 & 0 \\ 0 & -1 & 0 & 0 \\ 0 & 0 & 0 & 0 \\ 0 & 0 & 0 & 0 \end{pmatrix}, G_4 = \begin{pmatrix} 0 & 0 & 1 & 0 \\ 0 & 0 & 0 & 0 \\ 1 & 0 & 0 & 0 \\ 0 & 0 & 0 & 0 \end{pmatrix},$$

$$G_5 = \begin{pmatrix} 0 & 0 & -i & 0 \\ 0 & 0 & 0 & 0 \\ i & 0 & 0 & 0 \\ 0 & 0 & 0 & 0 \end{pmatrix}, G_6 = \begin{pmatrix} 0 & 0 & 0 & 0 \\ 0 & 0 & 1 & 0 \\ 0 & 1 & 0 & 0 \\ 0 & 0 & 0 & 0 \end{pmatrix},$$

$$G_7 = \begin{pmatrix} 1 & 0 & 0 & 0 \\ 0 & 0 & -i & 0 \\ 0 & i & 0 & 0 \\ 0 & 0 & 0 & 0 \end{pmatrix}, G_8 = \frac{1}{\sqrt{3}}\begin{pmatrix} 1 & 0 & 0 & 0 \\ 0 & 1 & 0 & 0 \\ 0 & 0 & -2 & 0 \\ 0 & 0 & 0 & 0 \end{pmatrix},$$

$$G_9 = \begin{pmatrix} 0 & 0 & 0 & 1 \\ 0 & 0 & 0 & 0 \\ 0 & 0 & 0 & 0 \\ 1 & 0 & 0 & 0 \end{pmatrix}, G_{10} = \begin{pmatrix} 0 & 0 & 0 & -i \\ 0 & 0 & 0 & 0 \\ 0 & 0 & 0 & 0 \\ i & 0 & 0 & 0 \end{pmatrix},$$

$$G_{11} = \begin{pmatrix} 0 & 0 & 0 & 0 \\ 0 & 0 & 0 & 1 \\ 0 & 0 & 0 & 0 \\ 0 & 1 & 0 & 0 \end{pmatrix}, G_{12} = \begin{pmatrix} 0 & 0 & 0 & 0 \\ 0 & 0 & 0 & -i \\ 0 & 0 & 0 & 0 \\ 0 & i & 0 & 0 \end{pmatrix},$$

$$G_{13} = \begin{pmatrix} 0 & 0 & 0 & 0 \\ 0 & 0 & 0 & 0 \\ 0 & 0 & 0 & 1 \\ 0 & 0 & 1 & 0 \end{pmatrix}, G_{14} = \begin{pmatrix} 0 & 0 & 0 & 0 \\ 0 & 0 & 0 & 0 \\ 0 & 0 & 0 & -i \\ 0 & 0 & i & 0 \end{pmatrix},$$

$$G_{15} = \frac{1}{\sqrt{6}}\begin{pmatrix} 1 & 0 & 0 & 0 \\ 0 & 1 & 0 & 0 \\ 0 & 0 & 1 & 0 \\ 0 & 0 & 0 & -3 \end{pmatrix}, G_{16} = \frac{1}{\sqrt{2}}\begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

What is claimed is:

1. A method comprising:
representing a beamforming matrix using a sum of weighted hermitian generator matrices; and
feeding back parameters that describe the weighting of the hermitian generator matrices, wherein representing a beamforming matrix using a sum of weighted hermitian generator matrices comprises projecting a natural logarithm of the beamforming matrix onto hermitian generator matrices.

2. The method of claim 1 wherein feeding back parameters comprises feeding back parameters for less than all orthogonal frequency division multiplexing (OFDM) subcarriers in a multiple input multiple output (MIMO) system.

3. The method of claim 1 wherein feeding back comprises transmitting parameters for less than all OFDM subcarriers in a MIMO system.

4. The method of claim 1 further comprising removing a global phase from the beamforming matrix.

5. The method of claim 1 wherein the beamforming matrix comprises two rows and two columns.

6. A method comprising:
representing a beamforming matrix using a sum of weighted hermitian generator matrices; and
feeding back parameters that describe the weighting of the hermitian generator matrices, wherein the parameters comprise coefficients to weight the hermitian generator matrices and wherein the parameters comprise at least two of $n_1$, $n_2$, and $n_3$, wherein $$\overline{V} = \cos(\Phi)G_4 + i\sin(\Phi)(n_1 G_1 + n_2 G_2 + n_3 G_3),$$

$\nabla$ is the beamforming matrix, $G_1$, $G_2$, $G_3$, and $G_4$ are hermitian generator matrices, and i is the square root of $-1$.

7. The method of claim 6 wherein the parameters further comprise $\cos(\Phi)$.

8. The method of claim 6 further comprising removing a global phase from the beamforming matrix.

9. The method of claim 6 wherein the parameters comprise $n_2$, $n_3$, and the sign of $n_1$.

10. A method comprising:
projecting a function of a beamforming matrix to a plurality of hermitian generator matrices;
removing a global phase from the beamforming matrix; and
transmitting at least one parameter corresponding to the plurality of hermitian generator matrices, wherein transmitting comprises transmitting $n^2-1$ parameters where n represents a dimension of the beamforming matrix, and wherein a range of at least one parameter is reduced by feeding back a sign bit.

11. The method of claim 10 wherein:
the beamforming matrix includes two rows and two columns.

12. The method of claim 10 wherein feeding back comprises transmitting parameters for less than all OFDM subcarriers in a MIMO system.

13. A method comprising:
receiving at least one parameter, wherein the at least one parameter includes a sign bit and a second parameter, wherein the sign bit is used to reduce a range of the second parameter; and
combining a weighted sum of at least one hermitian generator matrix using information derived from the at least one parameter to arrive at a beamforming matrix.

14. The method of claim 13 wherein:
the beamforming matrix comprises n rows and n columns; and
receiving at least one parameter comprises receiving $n_2-1$ parameters.

15. The method of claim 13 wherein receiving comprises receiving at least one parameter for less than all OFDM subcarriers in a MIMO system.

16. The method of claim 15 wherein combining comprises combining a weighted sum of at least one hermitian generator matrix for the less than all OFDM subcarriers.

17. The method of claim 16 further comprising interpolating to arrive at additional beamforming matrices.

18. An article comprising:
a machine-readable medium encoded with computer executable instructions that when accessed result in a machine representing a beamforming matrix using a sum of weighted hermitian generator matrices, and feeding back parameters that describe the weighting of the hermitian generator matrices, wherein the parameters comprise at least two of $n_1$, $n_2$, and $n_3$, wherein $$V = \cos(\Phi)G_4 + i\sin(\Phi)(n_1 G_1 + n_2 G_2 + n_3 G_3),$$

$V$ is the beamforming matrix, $G_1$, $G_2$, $G_3$, and $G_4$ are hermitian generator matrices, and i is the square root of −1.

19. The article of claim 18 wherein the parameters comprise $n_2$, $n_3$, and the sign of $n_1$.

20. The article of claim 19 wherein the parameters further comprise $\cos(\Phi)$.

21. An electronic system comprising:
n antennas;
a processor coupled to the n antennas;
an Ethernet interface; and
an article having a machine-readable medium encoded with computer executable instructions that when accessed result in the processor receiving at least one parameter, and combining a weighted sum of at least one hermitian generator matrix using information derived from the at least one parameter to arrive at a beamforming matrix, wherein the at least one parameter comprises at least two of $n_1$, $n_2$, and $n_3$, wherein $$V = \cos(\Phi)G_4 + i\sin(\Phi)(n_1 G_1 + n_2 G_2 + n_3 G_3),$$

$V$ is the beamforming matrix, $G_1$, $G_2$, $G_3$, and $G_4$ are hermitian generator matrices, and i is the square root of −1.

22. The electronic system of claim 21 wherein receiving comprises receiving at least one parameter for less than all OFDM subcarriers in a MIMO system.

23. The electronic system of claim 22 wherein the instructions, when accessed, further result in the processor interpolating to arrive at OFDM subcarrier beamforming matrices for which no parameters were received.

* * * * *

UNITED STATES PATENT AND TRADEMARK OFFICE
CERTIFICATE OF CORRECTION

PATENT NO. : 7,236,748 B2
APPLICATION NO. : 10/955826
DATED : June 26, 2007
INVENTOR(S) : Li et al.

It is certified that error appears in the above-identified patent and that said Letters Patent is hereby corrected as shown below:

On the Title page, in field (56), under "Other Publications", in column 2, line 2, delete "Seraching" and insert -- Searching --, therefor.

In column 13, line 12, in Claim 14, delete "$n_2-1$" and insert -- $n^2-1$ --, therefor.

Signed and Sealed this

Fourth Day of September, 2007

JON W. DUDAS
*Director of the United States Patent and Trademark Office*